W. B. PORTER.
Grain Drill.
No. 48,433.
Patented June 27, 1865.
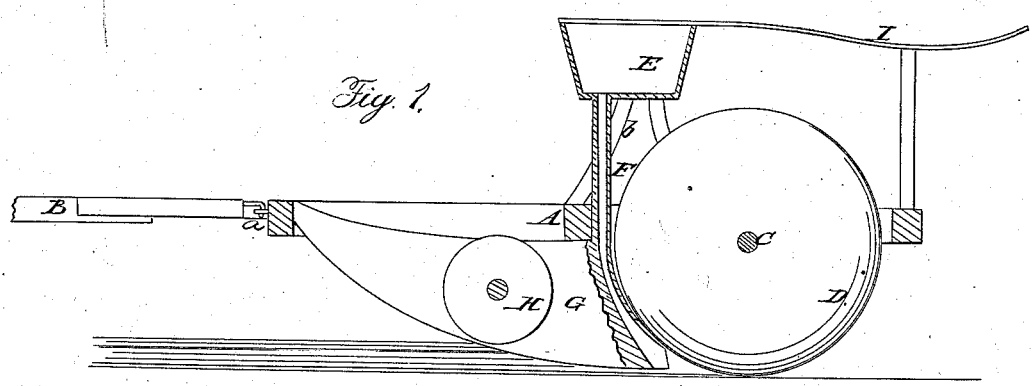
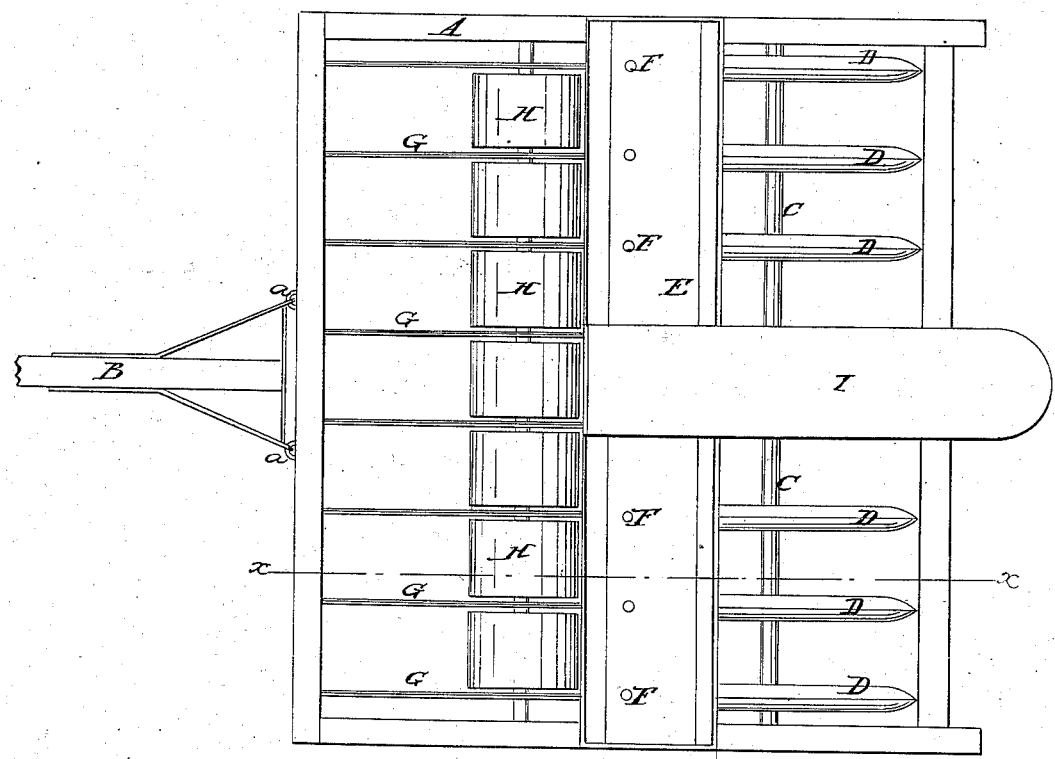

UNITED STATES PATENT OFFICE.

W. B. PORTER, OF FARMER CITY, MISSOURI.

IMPROVEMENT IN SEED-DRILLS.

Specification forming part of Letters Patent No. 48,433, dated June 27, 1865.

*To all whom it may concern:*

Be it known that I, W. B. PORTER, of Farmer City, in the county of Pettis and State of Missouri, have invented a new and Improved Wheat-Drill; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\ x$, Fig. 2; Fig. 2, a plan or top view of the same.

Similar letters of reference indicate corresponding parts.

The object of this invention is to obtain a machine for sowing wheat in any kind of ground, and one which will deposit it in the earth in such a manner that it will be protected from frost.

A represents a rectangular frame, to the front part of which a draft-pole, B, is attached by hooks or joints $a\ a$.

C C represent the axles, which are placed transversely in the rear of the frame A, in line with each other, and on which a series of wheels, D, are placed at suitable and equal distances apart. These wheels are beveled at each side, so that their peripheries terminate in a feather edge, as shown clearly in Fig. 2.

E represents a seed-box, which is secured to supports $b\ b$, and extends entirely across the frame A. This seed-box may be provided with any suitable seed-distributing apparatus, and from the box E there descends a series of tubes, F, which convey the seed from the box E down to the rear of the furrow-openers G, the latter being divaricated or forked at their rear ends. The furrow-openers G are in line with the wheels D, and they are curved at their lower edges, like sled-runners, as shown in Fig. 1, and they are also sharp at their lower edges, so as to cut through stalks, trash, and rubbish, so that the latter cannot interfere with the proper forming of the furrows, the width of which are made by the rear forked end of the openers. These furrow-openers, however, are not new. The same are used on a number of seeding-machines, and may be seen on a number of models now in the Patent Office.

Between the furrow-openers G there are placed rollers H. These rollers crush clods of earth and serve to prevent the machine being clogged up with trash.

I represents the driver's seat, which extends from the center of the seed-box E back to the rear part of the frame A.

From the above description it will be seen that as the machine is drawn along the openers G will make the furrows and the seed will be deposited in them, while the wheels D, owing to their beveled edges, will press the seed firmly into the earth and leave a ridge at each side, the seed being in and below the bottoms of the furrows, and protected from the frost by the ridges at each side. In turning at the ends of the field the driver moves himself back on the seat and throws up the front part of the machine, so that the furrow-openers G will be above the surface of the ground.

Having thus described my invention, I claim as new and desire to secure by Letters Patent—

The combination, with the furrow-openers G and wheels H, provided with beveled edges, of the rollers D, substantially as and for the purposes herein described.

W. B. PORTER.

Witnesses:
W. T. BLACK,
ZECHARIAH RAY.